(12) United States Patent
Cao et al.

(10) Patent No.: US 6,367,071 B1
(45) Date of Patent: Apr. 2, 2002

(54) COMPILER OPTIMIZATION TECHNIQUES FOR EXPLOITING A ZERO OVERHEAD LOOP MECHANISM

(75) Inventors: Vincent Phuoc Cao, Whitehall; Lincoln A. Fajardo, Kempton; Sanjay Jinturkar, Bethlehem; Gang-Ryung Uh, Allentown, all of PA (US); Yuhong Wang; David B. Whalley, both of Tallahassee, FL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/260,457

(22) Filed: Mar. 2, 1999

(51) Int. Cl.[7] .............................. G06F 9/45

(52) U.S. Cl. .................. 717/9; 717/2; 717/6

(58) Field of Search .............. 717/2, 6, 10, 5, 717/7, 9; 709/100; 712/241, 242

(56) References Cited

U.S. PATENT DOCUMENTS

| | | | | |
|---|---|---|---|---|
| 5,293,631 A | * | 3/1994 | Rau et al. ................ | 717/7 |
| 5,535,329 A | * | 7/1996 | Hastings .................. | 714/35 |
| 5,537,620 A | * | 7/1996 | Breternitz, Jr. ........... | 717/9 |
| 5,555,412 A | * | 9/1996 | Besaw et al. ............. | 717/8 |
| 5,704,053 A | * | 12/1997 | Santhanam ............... | 712/207 |
| 5,727,194 A | | 3/1998 | Shridhar et al. ........... | 712/241 |
| 5,787,285 A | * | 7/1998 | Lanning ................... | 717/4 |
| 5,797,013 A | * | 8/1998 | Mahadevan et al. ....... | 717/9 |
| 6,029,005 A | * | 2/2000 | Radigan ................... | 717/9 |
| 6,065,106 A | * | 5/2000 | Deao et al. ............... | 712/24 |
| 6,083,278 A | * | 7/2000 | Olson et al. .............. | 717/2 |
| 6,090,155 A | * | 7/2000 | Donovan et al. .......... | 717/9 |
| 6,090,156 A | * | 7/2000 | Macland ................... | 717/8 |
| 6,202,204 B1 | * | 3/2001 | Wu et al. .................. | 717/9 |

OTHER PUBLICATIONS

Clinger et al, "Lambda the ultimate label or a simple optimizing compiler for scheme", LISP ACM pp 128–139, Mar. 1994.*

Yasugi et al, "ABCL/on EM–4 a new software/hardware architecture for object orienetd concurretnt computing on an extended dataflow supercomputers", ICS ACM pp 93–103, Jun. 1992.*

Amarasinghe et al, "Coomunication optimization and code generation for distributed memory machines", ACM SIGPLAN PLDI, pp 126–138, Jun. 1993.*

Lee et al, "Performing data flow analysis in parallel", IEEE, pp 942–951, May 1990.*

Uh et al, "Effective exploiation of a zero overhead loop buffer", ACM LCTES, pp 10–19, May 1999.*

(List continued on next page.)

Primary Examiner—Mark R Powell
Assistant Examiner—Anil Khatri
(74) Attorney, Agent, or Firm—Ryan, Mason & Lewis, LLP

(57) ABSTRACT

The invention provides compiler loop optimization techniques to take advantage of a zero overhead loop mechanism (ZOLM) in a processor, e.g., a ZOLM in the form of a zero overhead loop buffer (ZOLB). In an illustrative embodiment, a compiler generates a first set of code, and then applies optimizations to the first set of code so as to generate a second set of code configured to operate efficiently with the ZOLB. The optimizations are designed to increase the number of loops of the first set of code that can be accommodated in the ZOLB, to further reduce the overhead of the loops placed in the ZOLB, and to eliminate redundant loading of the ZOLB. Optimizations for increasing the number of loops that can be accommodated in the ZOLB include, e.g., conditional instructions, loop splitting and function inlining. Optimizations for further reductions in loop overhead include, e.g., loop collapsing and loop interchange. Data flow analysis and loop peeling may be used to avoid redundant loading of the ZOLB.

22 Claims, 12 Drawing Sheets

OTHER PUBLICATIONS

Markatos et al, "using processor affinity in loop scheduling on shared memory multiprocessor", IEEE, pp 104–113, May 1992.*

A.V. Aho et al., "Compilers: Principles, Techniques and Tools," Addison Wesley Publishing Company, MA, pp. 532–534, 1986.

D.F. Bacon et al., "Compiler Transformations for High–Performance Computing," ACM Computing Surveys, vol. 26, No. 4, pp. 345–420, Dec. 1994.

J.L. Hennessy et al., "Computer Architecture: A Quantitative Approach," Morgan Kaufmann Publishers, Inc., San Mateo, CA, p. 38, 1996.

P. Lapsley et al., "DSP Processor Fundamentals—Architectures and Features," IEEE Press, pp. 91–94, 1996.

DSP16000 Digital Signal Processor Core Information Manual, Lucent Technologies, Allentown, PA, pp. 1–4, 1997.

DSP16000 Assembly Language User Guide, Lucent Technologies, Allentown, PA, pp. 1–6, 1997.

David Whalley, "DSP16000 C Optimizer Overview and Rationale," Lucent Technologies, Allentown, PA, pp. 1–9, Jul. 1998.

* cited by examiner

Assembly Syntax for
Using the do Instruction do k {
instruction 1
⋮
instruction n
}

Assembly Syntax for
Using the redo Instruction redo k

Source Code of Loop

```
for (i = 0; i < 10000; i++)
    a[i] = 0;
```

DSP16000 Assembly and Corresponding RTLs Without Using the ZOLB

| r0 = _a | # r[0]=ADDR(_a); |
| a2 = 0 | # a[2]=0; |
| a1 = -9999 | # a[1]=-9999; |
| L5: *r0++ = a2 | # M[r[0]]=a[2]; r[0]=r[0]+2; |
| a1 = a1 + 1 | # a[1]=a[1]+1; IC=a[1]+1?0; |
| if le goto L5 | # PC=IC<=0?L5:PC; |

After Using the ZOLB

```
cloop = 10000
r0 = _a
a2 = 0
do cloop {
    *r0++ = a2
}
```

FIG. 9(a)

Original Source Code

```
for (i = 0; i < 10000; i++)
    if (a[i] > 0)
        sum += a[i] ;
```

FIG. 9(b)

DSP16000 Assembly
Without Conditional Instructions

```
      r0 = _a
      a1 = -9999
L5:   a0 = *r0
      a0 = a0
      if gt goto L4
      a2 = a2 + a0
L4:   r0 = r0 + 2
      a1 = a1 + 1
      if le goto L5
```

FIG. 9(c)

DSP16000 Assembly
With Conditional Instructions

```
      r0 = _a
      a1 = -9999
L5:   a0 = *r0
      a0 = a0
      if le a2 = a2 + a0
      r0 = r0 + 2
      a1 = a1 + 1
      if le goto L5
```

FIG. 10(a)
Source Code Before Loop Splitting

```
for (i = 0; i < 10000; i++) {
    a[i] += a[i]*x;
    b[i] += b[i]*y;
    c[i] += c[i]*x;
    d[i] += d[i]*y;
    x = x+1;
    y = y+2;
}
```

FIG. 10(b)
Source Code After Loop Splitting

```
for (i = 0; i < 10000; i++) {
    a[i] += a[i]*x;
    c[i] += c[i]*x;
    x = x+1;
}
for (i = 0; i < 10000; i++) {
    b[i] += b[i]*y;
    d[i] += d[i]*y;
    y = y+2;
}
```

FIG. 11(a)
Source Code

```
int abs (int v)
{
    if (v < 0)
        v = -v;
    return v;
}
    ⋮
sum = 0;
for (i = 0; i < 10000; i++)
    sum += abs(a[i]);
    ⋮
```

FIG. 11(b)
Before Inlining

```
_abs: a0 = a0
      if lt a0 = -a0
      return
      ⋮
      r4 = _a
      a5 = 0
      a4 = -9999
L5:   a0 = *r4++
      call _abs
      a5 = a5 + a0
      a4 = a4 + 1
      if le goto L5
```

FIG. 11(c)
After Inlining

```
      r4 = _a
      a5 = 0
      a4 = -9999
L5:   a0 = *r4++
      a0 = a0
      if lt a0 = -a0
      a5 = a5 + a0
      a4 = a4 + 1
      if le goto L5
```

FIG. 12(a)
DSP16000 Assembly
After Using the ZOLB With
a1 Live After the Loop

```
cloop = 10000
r0 = _a
a2 = 0
do cloop {
*r0++ = a2
a1 = a1 + 1
}
```

FIG. 12(b)
DSP16000 Assembly
After Extracting the
Assignment to a1

```
cloop = 10000
r0 = _a
a2 = 0
do cloop {
*r0++ = a2
}
a1 = a1 + 10000
```

FIG. 13(a)
Original Nested Loops

```
int a [50] [100] ;

for (i = 0; i < 50; i++)
    for (j = 0; j < 100; j++)
        a[i] [j] = 0;
```

FIG. 13(b)
After Loop Collapsing

```
int a [5000];

for (i = 0; i < 5000; i++)
    a[i] = 0;
```

FIG. 14(a)
Source Code of Nested Loops

```
extern int a [200] [100] ;

for (i=0; i<200; i++)
    for (j=0; j<50; j++)
        a[i] [j]=0;
```

FIG. 14(b)
DSP16000 Assembly
Before Loop Interchange

```
        r1 = _a
        a3 = 0
        a2 = -199
L5:     r0 = r1
        a1 = -49
L9:     *r0++ = a3
        a1 = a1 + 1
        if le goto L9
        r1 = r1 + 200
        a2 = a2 +1
        if le goto L5
```

FIG. 14(c)
Source Code After Loop Interchange

```
extern int a [200] [100];

for (j=0; j<50; j++)
    for (i=0; i<200; i++)
        a[i] [j]=0;
```

FIG. 14(d)
DSP16000 Assembly
After Loop Interchange

```
        r1 = _a
        a3 = 0
        a2 = -49
L5:     r0 = r1
        a1 = -199
        j = 200
L9:     *r0++j = a3
        a1 = a1 +1
        if le goto L9
        r1 = r1 + 2
        a2 = a2 + 1
        if le goto L5
```

FIG. 14(e)
DSP16000 Assembly
After Using the ZOLB

```
        r1 = _a
        a3 = 0
        a2 = -49
L5:     cloop = 200
        r0 = r1
        j = 200
        do cloop {
            *r0++j = a3
        }
        r1 = r1 + 2
        a2 = a2 + 1
        if le goto L5
```

FIG. 15(a)
Source Code of Two Different Loops

```
extern int a[100], b[100];
extern float c[200], d[200];
...
for (i = 0; i < 100; i++)
    a[i] = b[i];
...
for (i = 0; i < 200; i++)
    c[i] = d[i];
...
```

FIG. 15(b)
DSP16000 Assembly After Using the ZOLB

```
r1 = _a
r0 = _b
do 100 {
a0 = *r0++
*r1++ = a0
}
...
cloop = 200
r1 = _c
r0 = _d
do cloop {
a0 = *r0++
*r1++ = a0
}
```

FIG. 15(c)
DSP16000 Assembly After Avoiding the Redundant ZOLB Load

```
r1 = _a
r0 = _b
do 100 {
a0 = *r0++
*r1++ = a0
}
...
cloop = 200
r1 = _c
r0 = _d
redo cloop
```

*FIG. 16*

- Let B represent a basic block in the program.
- Let N represent that no ZOLB loops can reach this point.
- Let F represent a called function.
- Let C represent a call to F that precedes block B.

$$in[B] = \begin{cases} N \\ \bigcup_{p \in pred(B)} \begin{cases} out[p] \cap \\ (out[C] \cup canaccess(F)) \\ out[p] \end{cases} & \text{if } p \text{ contains a return from F,} \\ & \text{otherwise.} \end{cases}$$

$$out[B] = \begin{cases} N & \text{if B contains a call to a library function,} \\ B & \text{if B contains a ZOLB loop,} \\ in[B] & \text{otherwise.} \end{cases} \quad \text{if B is entry block of main, otherwise.}$$

FIG. 17(a)

Source Code of Nested Loops

```
for (i = 0; i < 1000; i++)
    for (j = 0; j < 2000; j++)
        a[i][j] = 0;
```

FIG. 17(b)

DSP16000 Assembly Without Using the ZOLB

```
      r1 = _a
      a3 = 0
      a2 = -999
L5:   r0 = r1
      a1 = -1999
L9:   *r0++ = a3
      a1 = a1 + 1
      if le goto L9
      r1 = r1 + 200
      a2 = a2 + 1
      if le goto L5
```

FIG. 17(c)

DSP16000 Assembly After Using the ZOLB

```
      r1 = _a
      a3 = 0
      a2 = -999
L5:   cloop = 2000
      r0 = r1
      do cloop {
          *r0++ = a3
      }
      r1 = r1 + 200
      a2 = a2 + 1
      if le goto L5
```

FIG. 17(d)

DSP16000 Assembly After Loop Peeling

```
      r1 = _a
      a3 = 0
      a2 = -999
      cloop = 2000
      r0 = r1
      do cloop {
          *r0++ = a3
      }
      r1 = r1 + 200
      a2 = a2 + 1
L5:   cloop = 2000
      r0 = r1
      redo cloop
      r1 = r1 + 200
      a2 = a2 + 1
      if le goto L5
```

FIG. 18(a)

Source Code of Loop

```
sum = 0;
for (i = 0; a[i] != n; i++)
    sum += a[i] *2;
```

FIG. 18(b)

DSP16000 Assembly
Without Using the ZOLB

```
        r0 = _a
        a2 = 0
        r1 = _n
        a0 = *r0
        a1 = *r1
        a0 - a1
        if eq goto L3
L5:     a0 = *r0++
        a0 = a0 <<< 1
        a2 = a2 + a0
        a0 = *r0
        a0 - a1
        if ne goto L5
L3:
```

FIG. 18(c)

DSP16000 Assembly
After Using the ZOLB

```
        ...
        if eq goto L3
        cloop = <max value>
        a3 = 1
        do cloop {
            a4 = *(r0+2)
            a4 - a1
            if eq cloop = a3
            a0 = *r0++
            a0 = a0 <<< 1
            a2 = a2 + a0
        }
        goto L01
L02:    cloop = <max value>
        redo cloop
L01:    a4 - a1
        if ne goto L02
L3:
```

COMPILER OPTIMIZATION TECHNIQUES FOR EXPLOITING A ZERO OVERHEAD LOOP MECHANISM

FIELD OF THE INVENTION

The present invention relates generally to compilers for use in processing source code in digital signal processors, microprocessors, computer systems and other processing systems and devices, and more particularly to optimization techniques to exploit zero-overhead loop mechanisms.

BACKGROUND OF THE INVENTION

FIG. 1 is a simplified block diagram illustrating the operation of a conventional processing system 10. In the system 10, a program 12 provides source code as an input to a preprocessor 14. The preprocessor 14 performs tasks such as processing directives in the source code that cause the inclusion of files, and substituting expressions for defined constants or macros. The source code generally includes instructions configured in accordance with high level language titles, such as those associated with the C programming language. A compiler 15 receives the output of the preprocessor 14, and uses a set of optimization rules 16 to generate, from the preprocessed source code of program 102, corresponding object code/executable code which may be executed by a processor 18. Other implementations of the system 10 may combine the preprocessor 14 into the compiler 15. Conventional operations performed by the preprocessor 14 and compiler 15 are described in, for example, A. Aho et al., Compilers: Principles, Techniques and Tools, Addison-Wesley, 1988, which is incorporated by reference herein. Processor 18 may be a pipelined processor, or any other suitable processor.

In order to improve the performance of the system 10 in executing the program 12, various optimization techniques may be used. For many applications, a large percentage of the execution time is spent in the innermost loops of a program. The execution of these loops incur significant overhead, which is due to the execution of increment and branch instructions to initiate a new iteration of a loop. A number of hardware and software techniques have been used to minimize the loop overhead. Commonly used hardware techniques include, for example, hardware branch prediction, speculative execution, and minimizing branch latencies. Software techniques which may be implemented in an optimizing compiler include, for example, compile-time branch prediction, loop strength reduction, loop induction variable elimination and loop unrolling.

A conventional optimizing compiler is illustrated in greater detail in conjunction with FIGS. 2, 3 and 4. FIG. 2 shows the phases in a conventional optimizing compiler, which may be compiler 15 in the system 10 of FIG. 1. The compiler 15 includes a scanner 20, a parser 22, a code generator 24, an optimizer 26 and an assembly code generator 28. FIG. 3 shows conventional optimizations that may be applied by the optimizer 26 in the optimizing compiler 15. These optimizations include branch optimization 30, common subexpression elimination 32, constant propagation 34, loop optimizations 35, function inlining 36, and instruction scheduling 38. These optimizations may be repeated multiple times as required when compiling a function in a given program. FIG. 4 shows conventional loop optimizations that may be utilized in the optimizer as illustrated in FIG. 4. These loop optimizations include loop code motion 40, strength reduction 42, induction variable elimination 44, loop unrolling 46 and software pipelining 48. Like the optimizations of FIG. 3, the loop optimizations may be repeated for one or more additional loops as required. Details regarding these and other optimization techniques may be found in the above-cited Aho et al. reference.

Many code improving transformations and architectural features improve execution times at the expense of substantial code growth and more power consumption. For instance, the above-noted loop unrolling is a popular technique to decrease loop overhead. Yet, this approach often requires a significant increase in code size. DSP processors are typically used for applications in embedded systems that have strict code size and power limitations. Space increasing transformations, such as loop unrolling, are often unacceptable for many DSP applications due to these limitations.

A zero overhead loop buffer (ZOLB) is an architectural feature that is commonly found on DSP processors. This type of buffer can be used to increase the speed of applications with no increase in code size and often with reduced power consumption. A ZOLB is simply a buffer that contains a limited number of instructions. There are mechanisms to specify the number of times that the instructions in the buffer should be executed. Due to addressing complications, transfers of control instructions are not typically allowed in such buffers. Thus, a compiler or assembly writer attempts to execute many of the innermost loops of programs from this buffer. Unlike compiler techniques such as loop unrolling, a loop buffer can be used to efficiently reduce loop overhead without the penalty of increasing code size. This buffer can also be viewed as a compiler-managed cache that contains a sequence of instructions that will be executed a specified number of times. In addition, a ZOLB also requires very little power and space, which are both important considerations for most DSP applications.

Various techniques have been developed based on ZOLBs and other similar types of zero overhead loop mechanisms (ZOLMs). Some of these techniques are described in, e.g., P. Lapsley, J. Bier, A. Shoham and E. Lee, "DSP Processor Fundamentals - Architecture and Features," IEEE Press, 1996. Another known technique, a repeat-bit based system and method for executing zero overhead loops that does not require a repeat end register or a dedicated comparator, is described in detail in U.S. Pat. No. 5,727,194 issued to S. Avadhani and K. Nitta.

Techniques for generating code to take advantage of ZOLMs are described in U.S. Pat. application Ser. No. 09/200,580 filed Nov. 27, 1998 in the name of inventors Vincent Cao et al. and entitled "Compiler Optimization Techniques For Exploiting Zero Overhead Loop Mechanisms." For example, this application discloses code generation strategies for transforming loops so that the loops can exploit a ZOLB. Although the techniques described in this application provide significant improvements over prior techniques, further improvements are needed, particularly with respect to application of high performance compiler optimizations to exploitation of ZOLBs and other ZOLMs.

SUMMARY OF THE INVENTION

The invention discloses compiler optimization techniques designed to better exploit zero overhead loop buffers (ZOLBs) or other zero overhead loop mechanisms (ZOLMs) in a DSP, microprocessor or other processing device or system. In an illustrative embodiment, a compiler generates a first set of code, e.g., a set of assembly code from a corresponding set of source code, and then applies optimizations to the first set of code so as to generate a second set of code, e.g., an improved assembly code file, configured to operate efficiently with the ZOLB. The optimizations are designed to increase the number of loops of the first set of code that can be accommodated in the ZOLB, to further reduce the overhead of the loops placed in the ZOLB, and to eliminate redundant loading of the ZOLB. Optimizations for increasing the number of loops that can be accommodated in the ZOLB include, e.g., conditional instructions, loop splitting and function inlining. Optimizations for further reductions in loop overhead include, e.g., loop collapsing and loop interchange. Data flow analysis and loop peeling may be used to avoid redundant loading of the ZOLB.

The invention provides optimization techniques which ensure that output code generated by a compiler is configured to exploit ZOLMs of a given processor. The invention thus provides improved code execution time relative to conventional techniques which are generally unable to make use of ZOLMs. The invention can be applied to a variety of different types of DSPs, microprocessors, computer systems and other types of processing systems and devices. These and other features and advantages of the present invention will become more apparent from the accompanying drawings and the following detailed description.

BRIEF DESCRIPTION OF THE DRAWINGS

FIG. 6 shows the assembly language syntax for controlling a ZOLB in an exemplary DSP that may be used in conjunction with the invention.

FIG. 8 shows an example illustrating use of the ZOLB of FIG. 7.

FIG. 9 shows an example of using conditional instructions to allow more loops to be placed in a ZOLB, in accordance with the invention.

FIG. 10 shows an example of splitting loops to allow more loops to be placed in a ZOLB, in accordance with the invention.

FIG. 11 shows an example of inlining a function to allow more loops to be placed in a ZOLB, in accordance with the invention.

FIG. 12 shows an example of extracting increments of basic induction variables from a ZOLB, in accordance with the invention.

FIG. 13 shows an example of loop collapsing to eliminate additional loop overhead, in accordance with the invention.

FIG. 14 shows an example of loop interchange to increase the iterations executed in a ZOLB, in accordance with the invention.

FIG. 15 shows an example of avoiding a redundant load of a ZOLB, in accordance with the invention.

FIG. 16 shows exemplary data flow equations that are used to avoid redundant loading of loops in a ZOLB.

FIG. 17 shows an example of using loop peeling to avoid repeated loads of a ZOLB, in accordance with the invention.

FIG. 18 shows an example of placing a loop with an unknown number of iterations in a ZOLB, in accordance with the invention.

DETAILED DESCRIPTION OF THE INVENTION

The invention will be illustrated below in conjunction with an exemplary processor which includes a zero overhead loop mechanism (ZOLM). It should be understood, however, that the invention is more generally applicable to any processor or processing system in which it is desirable to exploit ZOLMs in an optimizing compiler. The term "processor" as used herein is intended to include any device in which instructions retrieved from a memory or other storage element are executed using one or more execution units. Exemplary processors in accordance with the invention may therefore include, for example, microprocessors, central processing units (CPUs), single-issue processors, multi-issue processors, digital signal processors, application-specific integrated circuits (ASICs), personal computers, mainframe computers, network computers, workstations and servers, and other types of data processing devices, as well as portions and combinations of these and other devices. The term "compiler" is intended to include any software program or other device which processes code of a particular level, e.g., source code, to generate corresponding code of a lower level, e.g., object code or executable code. A compiler may therefore be implemented as a device which also performs other non-compiler functions, for example, as a preprocessor/compiler, or as a stand-alone device. A "code block" refers generally to a set of one or more instructions.

The term "counting loop" refers generally to a loop whose iteration count can be determined either at compile time or at execution time prior to the entry into the loop code, i.e., the instructions comprising the loop. The "iteration count" of a loop is the number of times the loop is executed. A counting loop whose iteration count is known at compile time is referred to as a "compile-time counting loop." A counting loop whose iteration count is not known at compile time is referred to as an execution-time counting loop. The iteration count of execution-time counting loops can often be expressed in symbolic form, e.g., as the variable n. A loop whose iteration count cannot be determined either at compile time or at execution time prior to entry into the loop code is referred to as a "noncounting loop."

Figure 1:
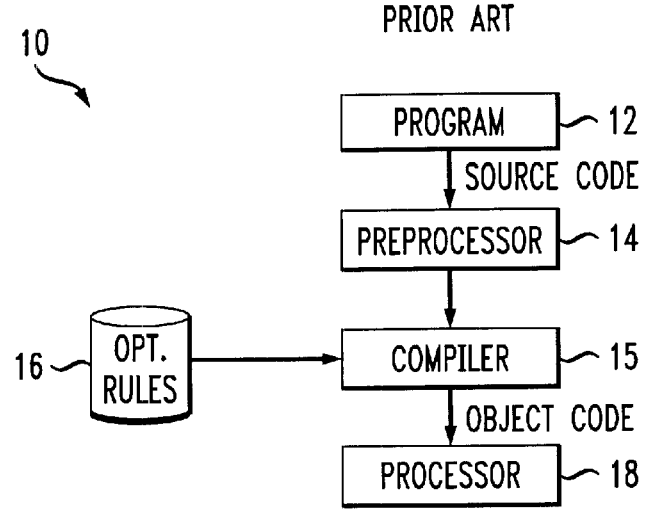
FIG. 1 is a block diagram of a conventional processing system.
Figure 2:
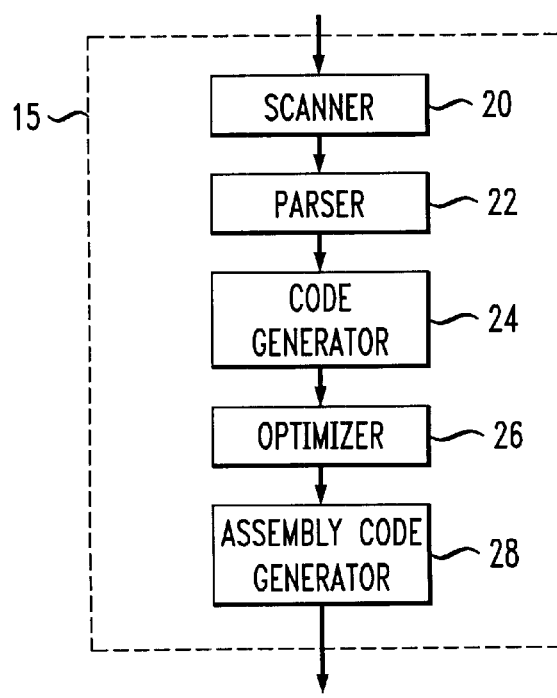
FIG. 2 shows a conventional optimizing compiler.
Figure 3:
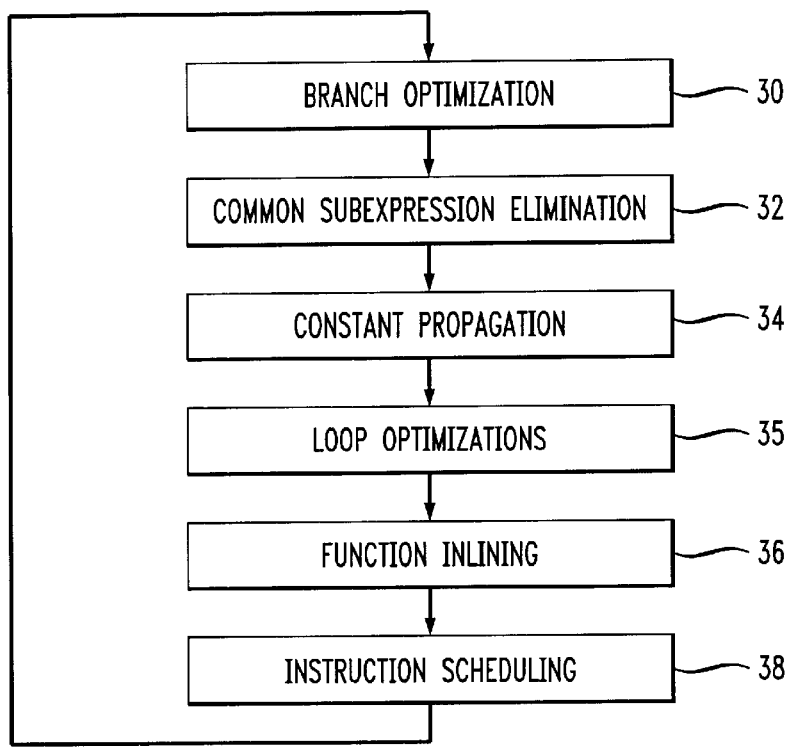
FIG. 3 illustrates the operation of an optimizer in the conventional compiler of FIG. 3.
Figure 4:
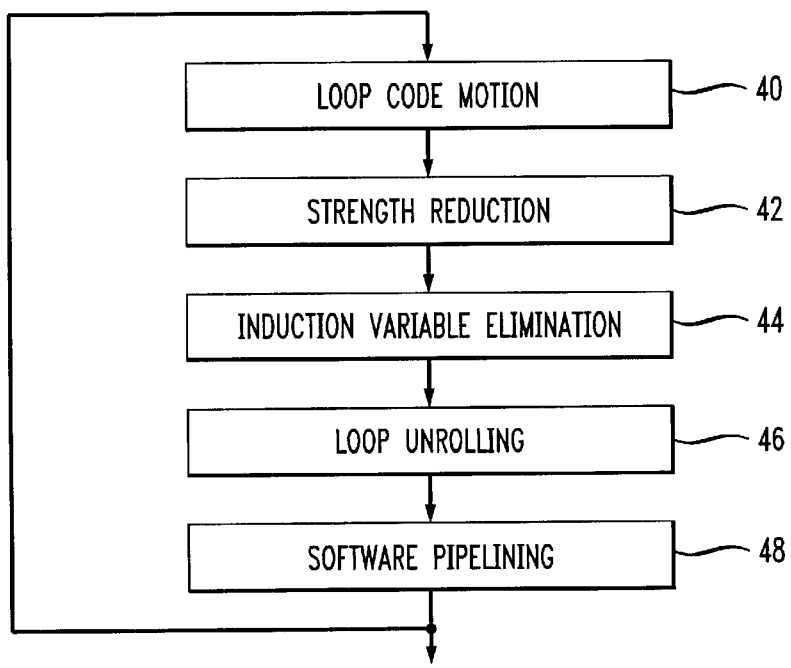
FIG. 4 illustrates loop optimizations which may be implemented in the FIG. 3 optimizer.

An illustrative embodiment of the invention to be described below is in the form of an optimizer, e.g., an optimizer in an otherwise conventional compiler such as compiler 15 of FIG. 2. The operation of the optimizer will be described in conjunction with a conventional DSP, i.e., a DSP16000 processor from Lucent Tehnologies Inc. There are a number of restrictions on the types of loops which can utilize the ZOLB on the DSP16000 processor. For example, the loop should always be a counting loop, and should contain a maximum of 31 instructions since the zero overhead loop buffer (ZOLB) in this processor can hold only up to 31 instructions. If the loop is a compile-time counting loop and its iteration count is less than 127, then the count can be put as an "immediate" in a ZOL instruction. If the loop is an execution-time counting loop, or a compile-time counting loop whose iteration count is greater than 127 but less than 65535, then the count is kept in a register. This register is referred to as the cloop register on the DSP16000 processor, and will be described in greater detail below. Finally, the loop should contain only one basic block, i.e., only one sequence of instructions delimited by a branch, label, or a function call. Therefore, the loop should be an innermost loop, i.e., a loop which does not contain any other nested loops. In addition, the loop should not consist of transfers of control other than the loop branch. For instance, the loop should not contain forward branches, function calls, unconditional jumps, indirect jumps, or return instructions. It should be noted that the invention can also be applied to any other type of DSP or processor, and that such processors may be subject to restrictions other than those listed above for the exemplary DSP16000 processor.

Figures 5, 6A, 6B:
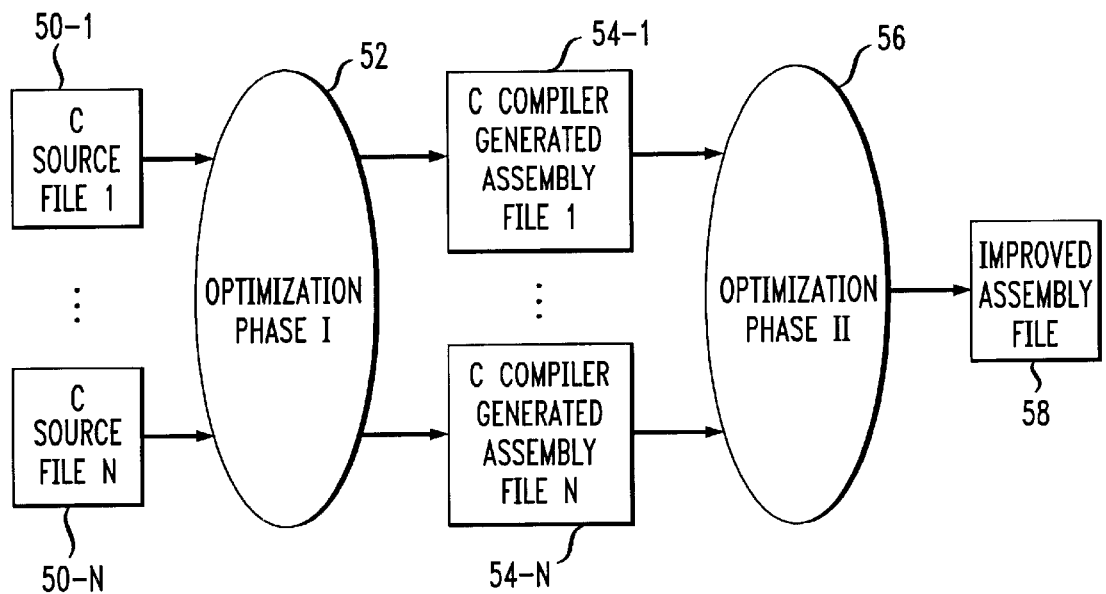
FIG. 5 shows an overview of a compilation process which may be used in conjunction with the invention.

FIG. 5 shows an overview of a compilation process which may be used in conjunction with the invention. Initially, code is generated using a C compiler retargeted to the DSP16000. This code includes C source files 50-1, 50-2, . . . 50-N as shown. In a Phase I optimization 52, conventional improving transformations in the C compiler are applied and corresponding assembly files 54-1, 54-2, . . . 54-N are generated. The generated code is then processed by using the above-noted optimizer of the present invention, which performs a number of improving transformations including those that exploit the ZOLB on the DSP16000 architecture. This operation is designated in FIG. 5 as Phase II optimization 56. The output of the Phase II optimization 56 is an improved assembly file 58. There are a number of advantages to exploiting a ZOLB using this approach. First, the exact number of instructions in a loop will be known after code generation, which will ensure that the maximum number of instructions that can be contained in the ZOLB is not exceeded. While performing the transformations after code generation may in some circumstances result in more complicated algorithms, the optimizer was generally able to apply transformations more frequently since it did not have to rely on conservative heuristics concerning the ratio of intermediate operations to machine instructions. Second, the use of interprocedural analysis and transformations has also proved to be valuable in exploiting a ZOLB. However, it should be understood that other types of compilation processes may be implemented using the techniques of the invention.

FIG. 6 shows the assembly language syntax used to control the ZOLB in the DSP16000 processor. This syntax includes two instructions, the do instruction and the redo instruction. The do instruction, as shown in FIG. 6(a), specifies that the n instructions enclosed within the brackets are to be executed k times. The actual encoding of the do instruction includes the value of n, which as previously noted can range from 1 to 31, indicating the number of instructions following the do instruction that are to be placed in the ZOLB. The value of k is also included in the encoding of the do instruction and represents the number of iterations associated with an innermost loop placed in the ZOLB. Wienk is a compile-time constant less than 128, it may be specified as a so-called immediate value since it will be small enough to be encoded into the instruction. Otherwise, a value of zero is encoded and the number of times the instructions in the ZOLB will be executed is obtained from the above-noted cloop register. The first iteration results in the instructions enclosed between the brackets being fetched from memory, executed, and loaded into the ZOLB. The remaining k-1 iterations are executed from the ZOLB. The redo instruction, as shown in FIG. 6(b), is similar to the do instruction, except that the current contents of the ZOLB are executed k times.

Figures 7, 8A, 8B, 8C:
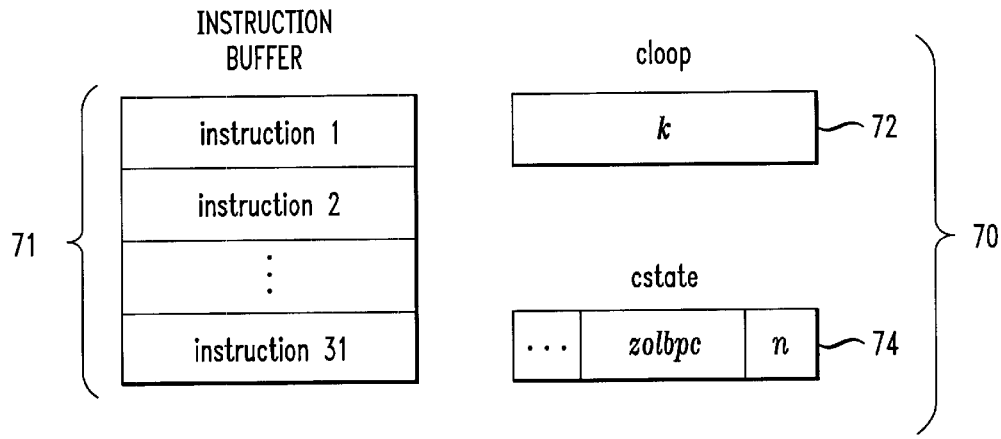
FIG. 7 shows the ZOLB hardware associated with the exemplary DSP whose ZOLB assembly language syntax is shown in FIG. 6.

FIG. 7 shows the ZOLB hardware associated with the DSP16000. A ZOLB 70 includes an instruction register 71, which in this embodiment is capable of storing 31 instructions, designated instruction 1 through instruction 31, a cloop register 72 for storing the above-described variable k, and a estate register 74 containing the number of instructions n in the loop and a pointer zolbpc to the current instruction to load or execute. The cloop register is initially assigned the number of iterations k and is implicitly decremented on each iteration.

FIG. 8 shows an example illustrating use of the ZOLB of FIG. 7. FIG. 8(a) shows the source code for a simple loop, and FIG. 8(b) shows the corresponding code for the DSP16000 without placing instructions in the ZOLB. The effects of these instructions are also shown as RTLs in this figure. The DSP16000, like many other DSP architectures, use an instruction set that is highly specialized for known DSP applications, and includes complex features such as separation of address (r0–r7) and accumulator (a0–a7) registers, postincrements of address registers, and implicit sets of condition codes from accumulator operations. In the FIG. 8 example, the loop variable is set to a negative value before the loop and is incremented on each loop iteration. FIG. 8(c) shows the equivalent code after placing instructions in the ZOLB. The branch in the loop is deleted since the loop will be executed the desired number of iterations. After applying basic induction variable elimination and dead store elimination, the increment and initialization of al are removed. Thus, the loop overhead has been eliminated through the use of the ZOLB.

The present invention relates generally to interactions between high performance compiler optimizations and a ZOLB or other similar ZOLM architectural features commonly found in DSPs and other processors. The invention provides strategies for using high performance compiler transformations to effectively use a ZOLB. The inventors have determined that high performance compiler optimizations, some of which have been previously used to improve code on general purpose architectures, can be quite effective in allowing more loops to be placed in a ZOLB, in further reducing loop overhead of the loops placed in a ZOLB, and in avoiding redundant loading of ZOLB loops. Conventional aspects of certain of the compiler optimizations described herein may be found in, e.g., D. F. Bacon et al., "Compiler Transformations for High-Performance Computing," Computing Surveys, 26(4), pp. 345–420, December 1994, and in the above-cited Aho et al. reference. As previously noted, the illustrative embodiment of the invention to be described below is an optimizer, which may be implemented in an otherwise conventional compiler. The optimizer allows more loops to be placed in a ZOLB, further reduces loop overhead of the loops placed in a ZOLB, and avoids redundant loading of ZOLB loops.

COMPILER OPTIMIZATIONS TO EFFECTIVELY USE THE ZOLB FOR MORE LOOPS

This section describes how compiler optimizations applied in accordance with the invention allow a ZOLB to be effectively used for more loops, thereby resulting in a significant increase in instruction execution speed. Although similar compiler optimizations have been used in different contexts, such as high performance computers, it is believed that these optimizations have not heretofore been applied to increase the number of loops that can be placed in a ZOLB or to further reduce the overhead of the loops that are placed in a ZOLB.

Conditional Instructions

One limiting factor that prevents the exploitation of a ZOLB for many loops is that transfers of control generally cannot be executed from a ZOLB. In accordance with the invention, this limitation can be partially overcome by the use of conditional instructions. Consider the example source code in FIG. 9(a), which shows a loop with an assignment that is dependent on a condition. The assembly code in FIG. 9(b) cannot be placed into a ZOLB since there is a conditional branch that is not associated with the exit condition of the loop. A compiler can be configured to utilize predicated execution when possible to avoid this problem. FIG. 9(c) depicts the same loop with a conditional instruction, and this loop can be transformed to be executed from a ZOLB.

Loop Splitting

Another factor that sometimes prevented loops from being placed in a ZOLB is a limit on the number of instructions, c.g., 31 instructions in the DSP16000 ZOLB. Consider the loop in FIG. 10(a). When translated to DSP16000 assembly, this loop requires 34 instructions. However, not all of the statements in the loop are dependent. An optimizer in accordance with the invention therefore attempts to split loops if the sets of dependent instructions can be reorganized into separate loops that can all be placed in a ZOLB. The optimizer first finds all of the sets of dependent instructions. The conditional branch and the instructions that contribute to setting the condition codes for that branch are treated separately since they will be placed with each set. Note that these instructions will typically be deleted once loops are placed in the ZOLB and the transformations for basic induction variable elimination and dead store elimination are performed. The optimizer then checks if each set will fit in the ZOLB and combines multiple sets together if it is possible. FIG. 10(b) shows the source code after loop splitting. Now each of the two loops require 18 DSP16000 instructions and therefore both can be placed in a ZOLB. While this example and most of the remaining examples herein are given at the source code level to simplify their presentation, loop splitting and the other improving transformations to exploit the DSP16000 ZOLB were actually performed after code generation so that the exact number of instructions would be known.

Function Inlining

A call instruction is another transfer of control that cannot be placed in the DSP16000 ZOLB. Consider the source code and corresponding DSP16000 assembly in FIGS. 11(a) and 11(b). The loop cannot be placed in a ZOLB since it contains a call instruction. However, the function can be inlined as shown in FIG. 11(c) and the ZOLB can be used for the resulting loop. The optimizer does not inline indiscriminately due to potential growth in code size. However, the optimizer inlines functions that are called from a loop when the loop after inlining can be placed in the ZOLB, i.e., provides limited code growth for measurable performance benefits. This occurs when the number of instructions in the inlined loop does not exceed the number of instructions in the ZOLB and there are no transfers of control in the function to be inlined. Likewise, inlining of a function is performed when the function is only called from one site, i.e., performed with no code growth.

TRANSFORMATIONS TO FURTHER REDUCE LOOP OVERHEAD

As noted in conjunction with the example of FIG. 8, basic induction variable and dead store elimination are invoked after placing a loop in a ZOLB since often assignments to the loop variable associated with the exit condition are unnecessary due to the branch no longer being in the loop. For example, consider if the value of i was used after the loop in FIG. 8(b). The optimizer could not delete the increment of basic induction variable al as depicted in FIG. 12(a). In accordance with the invention, when the value of the basic induction variable is used after the loop and is used for no other purpose in the loop, the optimizer extracts these increments of the variable from the loop. First, the increments in the loop are deleted. Next, a new increment of the variable is placed after the loop. FIG. 12(b) shows that the new increment value is the product of the original increment and the number of loop iterations.

Loop Collapsing

Another approach that is often used to reduce the overhead associated with outer level loops is to collapse nested loops into a single loop. FIG. 13(a) shows nested loops that initialize every element of a matrix. FIG. 13(b) shows how the array is conceptually accessed after these loops are collapsed by the optimizer into a single loop. After placing the collapsed loop into the ZOLB, the loop overheads for both original loops are entirely eliminated.

Loop Interchange

FIG. 14(a) shows an example of two nested loops that cannot be collapsed since not all of the elements of each row of the matrix are accessed. FIG. 14(a) shows the source code, and FIG. 14(b) shows the corresponding DSP16000 assembly code. However, the two nested loops can be interchanged, as shown by the source code and assembly code in FIGS. 14(c) and 14(d), respectively. After interchanging the two loops, the inner loop now has a greater number of loop iterations. As a result, more loop overhead is now eliminated by placing the interchanged inner loop in the ZOLB as opposed to the original inner loop. An optimizer in accordance with the invention therefore attempts to interchange nested loops when the loops cannot be collapsed, the loops are perfectly nested, the number of iterations for the original inner loop is less than the number of iterations for the original outer loop, and the resulting inner loop can be placed in the ZOLB. Note that loop interchanging should not be performed if it will degrade the performance of the memory hierarchy. This is generally not an issue for the exemplary DSP16000 processor, since it has no data cache and only a limited on-chip RAM, although it may be an issue for other processors. FIG. 14(e) shows the DSP16000 assembly code after using the ZOLB.

AVOIDING REDUNDANT LOADS OF THE ZOLB

The above-described do instruction indicates that a specified number of instructions following the do will be loaded into the ZOLB. Depending upon the implementation of the DSP architecture, instructions may be fetched faster from a ZOLB than the conventional memory system. In addition, contention for the memory system may be reduced when a ZOLB is used. The redo instruction has similar semantics as the do instruction, except that the redo does not cause any instructions to be loaded into the ZOLB. Instead, the current contents of the ZOLB are simply executed the specified number of iterations.

In accordance with the invention, the redo instruction can be used to avoid redundant loads of loops into the ZOLB. Consider the source code shown in FIG. 15(a). It would appear that the two loops in this source code are quite different since they iterate a different number of times, access different variables, and access different types of data. However, the bodies of the two loops are identical as shown in the FIG. 15(b) assembly code. The reason is that much of the characteristics of the loops have been abstracted out of the loop bodies. The number of iterations for ZOLB loops is encoded in the do instruction or assigned to the cloop register preceding the loop. The addresses of the arrays are assigned to basic induction variables preceding the loop after loop strength reduction is performed. In addition, data moves of the same size are accomplished in the same manner on the DSP16000, regardless of the data types. FIG. 15(c) shows the assembly code after the redundant loop of the ZOLB is eliminated using the redo instruction. The optimizer of the invention had to determine which ZOLB loops can reach each point in the control flow without the contents of the ZOLB being changed. Interprocedural flow analysis was used to determine if the loading of each ZOLB loop was necessary.

FIG. 16 shows the data flow equations that were used to determine which ZOLB loops could possibly reach each point in the control flow. A bit was associated with each ZOLB loop and one bit was also reserved to indicate that no ZOLB loops could reach a given point. As shown in the FIG. 16 equations, an adjustment was made when ZOLB loop information was propagated from a return block of a function. This adjustment prevented ZOLB loops that are propagated into the entry block of a function from one call site from being propagated to the block following a call to the same function from a different call site. Likewise, it was assumed that no ZOLB loops could reach the point after a library call since it was not known where the ZOLB would be used in the called function.

After all of the ZOLB loop reaching information is calculated, the optimizer determines which ZOLB loops do not need to be loaded into the ZOLB. If the in of a current block containing a ZOLB indicates that a single ZOLB loop can reach that point and if all of the instructions in that ZOLB loop are identical with the instructions in the current ZOLB, then the entire current ZOLB loop is replaced with a redo instruction.

Even after using flow analysis to avoid redundant loops of ZOLB loops, many loops are repeatedly loaded into the ZOLB because they are in nested loops. An optimizer in accordance with the invention can be modified to avoid these redundant loads as well. FIGS. 17(a) and 17(b) contain the source code and corresponding DSP assembly code, respectively, for two nested loops. FIG. 17(c) shows the assembly code after the inner loop is placed in the ZOLB. For each iteration of the outer loop, the inner loop must be loaded into the ZOLB using the do instruction. FIG. 17(d) shows how the optimizer of the present invention avoids the repeated loading of the inner loop in the ZOLB by peeling an iteration of the outer loop. Only in the peeled iteration is the ZOLB loaded. All remaining iterations execute from the ZOLB using the redo instruction. The optimizer of the illustrative embodiment of the invention only performs this transformation when the code size increase is small and there are performance benefits from avoiding the repeated load of the inner loop into the ZOLB.

Using the ZOLB for Noncounting Loops

Often the number of iterations associated with a loop is unknown. However, sometimes such noncounting loops can still be placed in the ZOLB. Consider the source code shown in FIG. 18(a) and the corresponding DSP16000 assembly code shown in FIG. 18(b). Note that the a0=*r0 instruction is to the next element in the array a since r0 has been postincremented in a previous instruction. The number of iterations is unknown since it is not known which will be the first element of array a that will be equal to n. For each iteration of a ZOLB loop on the DSP16000 the cloop register is first decremented by one and then tested. The ZOLB is exited when this register is equal to zero. Thus, assigning a value of one to the cloop register can cause the loop to exit after the current iteration completes. The loop in FIG. 18(b) can be transformed to be placed in the ZOLB since the cloop register can be conditionally assigned a value in a register. FIG. 18(c) depicts the transformed code. The cloop register is initially set to the maximum value that can be assigned to this register and a register, a3, is allocated to hold the value 1. The a[i]! =n test is accomplished by the last three instructions in FIG. 18(b). To force an exit from the ZOLB on the DSP16000, the cloop register must be assigned a value of I at least three instructions before the end of the loop due to the latency requirements of the processor. Moving three instructions after the branch, comparison, and instructions that affect the comparison often required the optimizer to perform register renaming and adjusting the displacements of memory references, as shown in FIG. 18(c). Since the loop iterates an unknown number of times, another loop is placed after the ZOLB that will repeatedly redo the ZOLB loop until the exit condition has been satisfied. Note that unlike ZOLB loops with a known number of iterations, the number of instructions in this ZOLB loop is not less than the number of instructions before the loop was placed in the ZOLB. However, conditional branches on the DSP16000 require more cycles than conditional assignments. Other potential benefits include reducing contention to the memory system in the loop. Thus, there is a performance benefit on the DSP16000 from placing loops with an unknown number of iterations in the ZOLB.

ORDERING THE COMPILER OPTIMIZATIONS TO EXPLOIT A ZOLB

An exemplary algorithm for ordering the above-described compiler optimizations to exploit a ZOLB is given below. This algorithm may be implemented in an optimizer configured in accordance with the invention. It should be noted that the steps in the algorithm arc exemplary only, and other algorithms in accordance with the invention may utilize only a subset of these steps, or a different ordering of the steps.

The exemplary algorithm performs the following steps:

1. Use conditional assignments to eliminate conditional branches.

2. Inline functions into loops from which they are called when the resulting loop can be placed in the ZOLB.

3. Merge multiple basic blocks into a single basic block when it is possible. Many opportunities for merging blocks may result from using conditional assignments and inlining.

4. Coalesce nested loops into a single loop when it is possible so the number of iterations for the innermost loops in the program would be increased.

5. Perform loop interchange when possible on remaining nested loops so the inner loop will perform a greater number of iterations.

6. Split loops when independent sets of instructions can be found and when the number of instructions in the loop exceeds the number that can be placed in the ZOLB.

7. Transform innermost loops when possible so they can be placed in the ZOLB. This includes both loops with a known and unknown number of iterations.

8. Perform basic induction variable elimination to remove increments from loops when the value of the variable is not used after the loop.

9. If the value of the variable is used after the loop, perform basic induction variable extraction to move increments after the loop.

10. Perform interprocedural flow analysis and replace redundant loads of ZOLBs with a redo instruction.

11. Perform loop peeling so repeated loads of the ZOLB in loops can be avoided.

In implementing the above algorithm, the optimizer first performs compiler optimizations that will simplify the control flow to allow other optimizations, such as placing a loop in a ZOLB, to be performed. These control-flow simplifying optimizations include eliminating conditional branches through the use of conditional assignments, inlining functions into loops, and merging basic blocks. Second, optimizations should be performed that increase the number of iterations of innermost loops, which will increase the benefit when these loops are placed in a ZOLB. These iteration-increasing optimizations include loop collapsing and loop interchange. Loop collapsing generally has a greater benefit than loop interchange, so loop collapsing is performed first and loop interchange is only attempted on the nested loops that cannot be collapsed. Splitting loops can prevent both loop coalescing and loop interchange from occurring, so loop splitting should occur after these two optimizations. At this point, all optimizations have been applied that will allow the maximum number of loops with the greatest number of iterations to be placed in the ZOLB. Thus, the optimizer can now attempt to perform the transformations to place the innermost loops of a program in the ZOLB. Finally, basic induction variable elimination and extraction is performed after placing loops in the ZOLB since often the variables incremented will no longer be used in the loop. Next, redundant loads of the ZOLB can be avoided after the ZOLB is actually used. Flow analysis can be performed to eliminate loads of the ZOLB that are redundant, followed by loop peeling to eliminate repeated loads of the ZOLB in loops where flow analysis could not already eliminate those loads.

The present invention may be configured to meet the requirements of a variety of different processing applications and environments, using any desired type of compiler and processor. For example, the invention may be implemented in an otherwise conventional compiler. It should also be noted that the invention may be implemented at least in part in software, e.g., using a machine-readable medium, such as an electronic memory or a magnetic or optical disk containing one or more programs which, when executed in a computer or other processor or processing system, provide the compiler optimization functions described herein. The above-described embodiments of the invention are therefore intended to be illustrative only. Numerous alternative embodiments within the scope of the following claims will be apparent to those skilled in the art.

What is claimed is:

1. A method of processing code in a processing system in accordance with a compiler, the method comprising the steps of:
    generating a first set of code; and
    applying optimizations to the first set of code so as to generate a second set of code configured to operate with a zero overhead loop mechanism of a processor of the system, wherein the optimizations are operative to provide: (i) an increase in the number of loops of the first set of code that can be accommodated in the zero overhead loop mechanism via one or more of conditional instructions, loop splitting and function inlining; (ii) a reduction in the overhead associated with one or more loops in the zero overhead loop mechanism via one or more of loop collapsing and loop interchange; and (iii) elimination of a redundant loading of the zero overhead loop mechanism via one or more of data flow analysis and loop peeling.

2. The method of claim 1 wherein the generating step includes compiling a set of source code to generate the first set of code as a corresponding set of assembly code.

3. The method of claim 2 wherein the applying step is implemented in an optimizer associated with the compiler.

4. The method of claim 1 wherein the zero overhead loop mechanism of the processor includes a zero overhead loop buffer having a capacity for storing a plurality of instructions.

5. The method of claim 4 wherein the applying step includes adding one or more of the conditional instructions to the first set of code in order to allow at least one additional loop to be placed in the zero overhead loop buffer.

6. The method of claim 4 wherein the loop splitting of the applying step includes splitting at least one loop in the first set of code in order to allow at least one additional loop to be placed in the zero overhead loop buffer.

7. The method of claim 4 wherein the function inlining of the applying step includes inlining a function associated with the first set of code in order to allow at least one additional loop to be placed in the zero overhead loop buffer.

8. The method of claim 4 wherein the applying step further includes extracting increments of basic induction variables from the first set of code.

9. The method of claim 4 wherein the loop collapsing of the applying step further includes collapsing at least one loop in the first set of code to eliminate additional loop overhead.

10. The method of claim 4 wherein the loop interchange of the applying step further includes interchanging one loop in the first set of code with another loop in the first set of code in order to increase the iterations executed in the zero overhead loop buffer.

11. The method of claim 4 wherein the loop peeling of the applying step further includes avoiding a redundant load of the zero overhead loop buffer by using a loop peeling operation to avoid repeated loads of the zero overhead loop buffer.

12. An apparatus for processing code in a processing system, the apparatus comprising:
    a processor which includes a zero overhead loop mechanism; and
    a compiler operative to generate a first set of code; and to apply optimizations to the first set of code so as to generate a second set of code configured to operate with the zero overhead loop mechanism, wherein the optimizations provide: (i) an increase in the number of loops of the first set of code that can be accommodated in the zero overhead loop mechanism via one or more of conditional instructions, loop splitting and function inlining; (ii) a reduction in the overhead associated with one or more loops in the zero overhead loop mechanism via one or more of loop collapsing and loop interchange; and (iii) elimination of a redundant loading of the zero overhead loop mechanism via one or more of data flow analysis and loop peeling.

13. The apparatus of claim 12 wherein the zero overhead loop mechanism of the processor includes a zero overhead loop buffer having a capacity for storing a plurality of instructions.

14. The apparatus of claim 13 wherein the compiler is further operative to add one or more of the conditional instructions to the first set of code in order to allow at least one additional loop to be placed in the zero overhead loop buffer.

15. The apparatus of claim 13 wherein the compiler is further operative to perform loop splitting by splitting at least one loop in the first set of code in order to allow at least one additional loop to be placed in the zero overhead loop buffer.

16. The apparatus of claim 13 wherein the compiler is further operative to perform function inlining by inlining a function associated with the first set of code in order to allow at least one additional loop to be placed in the zero overhead loop buffer.

17. The apparatus of claim 13 wherein the compiler is further operative to extract increments of basic induction variables from the first set of code.

18. The apparatus of claim 13 wherein the compiler is further operative to perform loop collapsing by collapsing at least one loop in the first set of code to eliminate additional loop overhead.

19. The apparatus of claim 13 wherein the compiler is further operative to perform loop interchanging by interchanging one loop in the first set of code with another loop in the first set of code in order to increase the iterations executed in the zero overhead loop buffer.

20. The apparatus of claim 13 wherein the compiler is further operative to perform loop peeling to avoid a redundant load of the zero overhead loop buffer by using a loop peeling operation to avoid repeated loads of the zero overhead loop buffer.

21. A machine-readable medium containing one or more programs, for use in accordance with a compiler, which when executed implement the steps of:

generating a first set of code; and applying optimizations to the first set of code so as to generate a second set of code configured to operate with a zero overhead loop mechanism of a processor of the system, wherein the optimizations are operative to provide: (i) an increase in the number of loops of the first set of code that can be accommodated in the zero overhead loop mechanism via one or more of conditional instructions, loop splitting and function inlining; (ii) a reduction in the overhead associated with one or more loops in the zero overhead loop mechanism via one or more of loop collapsing and loop interchange; and (iii) elimination of a redundant loading of the zero overhead loop mechanism via one or more of data flow analysis and loop peeling.

22. An apparatus for processing code in a processing system, the apparatus comprising compiler means for:

generating a first set of code; and applying optimizations to the first set of code so as to generate a second set of code configured to operate with a zero overhead loop mechanism of a processor of the system, wherein the optimizations are operative to provide: (i) an increase in the number of loops of the first set of code that can be accommodated in the zero overhead loop mechanism via one or more of conditional instructions, loop splitting and function inlining; (ii) a reduction in the overhead associated with one or more loops in the zero overhead loop mechanism via one or more of loop collapsing and loop interchange; and (iii) elimination of a redundant loading of the zero overhead loop mechanism via one or more of data flow analysis and loop peeling.

* * * * *